(12) United States Patent
Zeng et al.

(10) Patent No.: US 7,275,379 B2
(45) Date of Patent: Oct. 2, 2007

(54) AUTOMOTIVE HVAC SYSTEM AND METHOD OF OPERATING SAME UTILIZING ENTHALPY-BASED CONTROL

(75) Inventors: Xin Zeng, Auburn Hills, MI (US); Christopher C. Nyeholt, Armada, MI (US); Harry E. Eustice, Troy, MI (US)

(73) Assignee: General Motors Corporation, Detroit, MI (US)

( * ) Notice: Subject to any disclaimer, the term of this patent is extended or adjusted under 35 U.S.C. 154(b) by 494 days.

(21) Appl. No.: 10/874,090

(22) Filed: Jun. 22, 2004

(65) Prior Publication Data

US 2005/0279110 A1    Dec. 22, 2005

(51) Int. Cl.
*F25B 1/00* (2006.01)
*F25B 49/00* (2006.01)
*F25D 17/04* (2006.01)

(52) U.S. Cl. ............... 62/176.6; 62/176.3; 62/228.3

(58) Field of Classification Search ............ 62/176.3, 62/176.6, 215, 226, 228.3, 228.4; 92/12.2, 92/13
See application file for complete search history.

(56) References Cited

U.S. PATENT DOCUMENTS

| | | | | |
|---|---|---|---|---|
| 5,299,431 A | * | 4/1994 | Iritani et al. | 62/243 |
| 5,355,689 A | * | 10/1994 | Hara et al. | 62/159 |
| 6,269,650 B1 | * | 8/2001 | Shaw | 62/176.6 |
| 6,334,325 B1 | * | 1/2002 | Herpel et al. | 62/277 |
| 6,694,764 B1 | * | 2/2004 | Eckstein et al. | 62/228.3 |

* cited by examiner

*Primary Examiner*—Chen Wen Jiang

(57) ABSTRACT

The present invention concerns a method for controlling the operation of an automotive HVAC system. The HVAC system includes at least a refrigerant compressor and a refrigerant evaporator. The method includes the steps of calculating an ambient air enthalpy value; comparing the calculated ambient air enthalpy value to at least one predetermined enthalpy value; and selectively changing the operation of the refrigerant compressor based on the comparison.

18 Claims, 5 Drawing Sheets

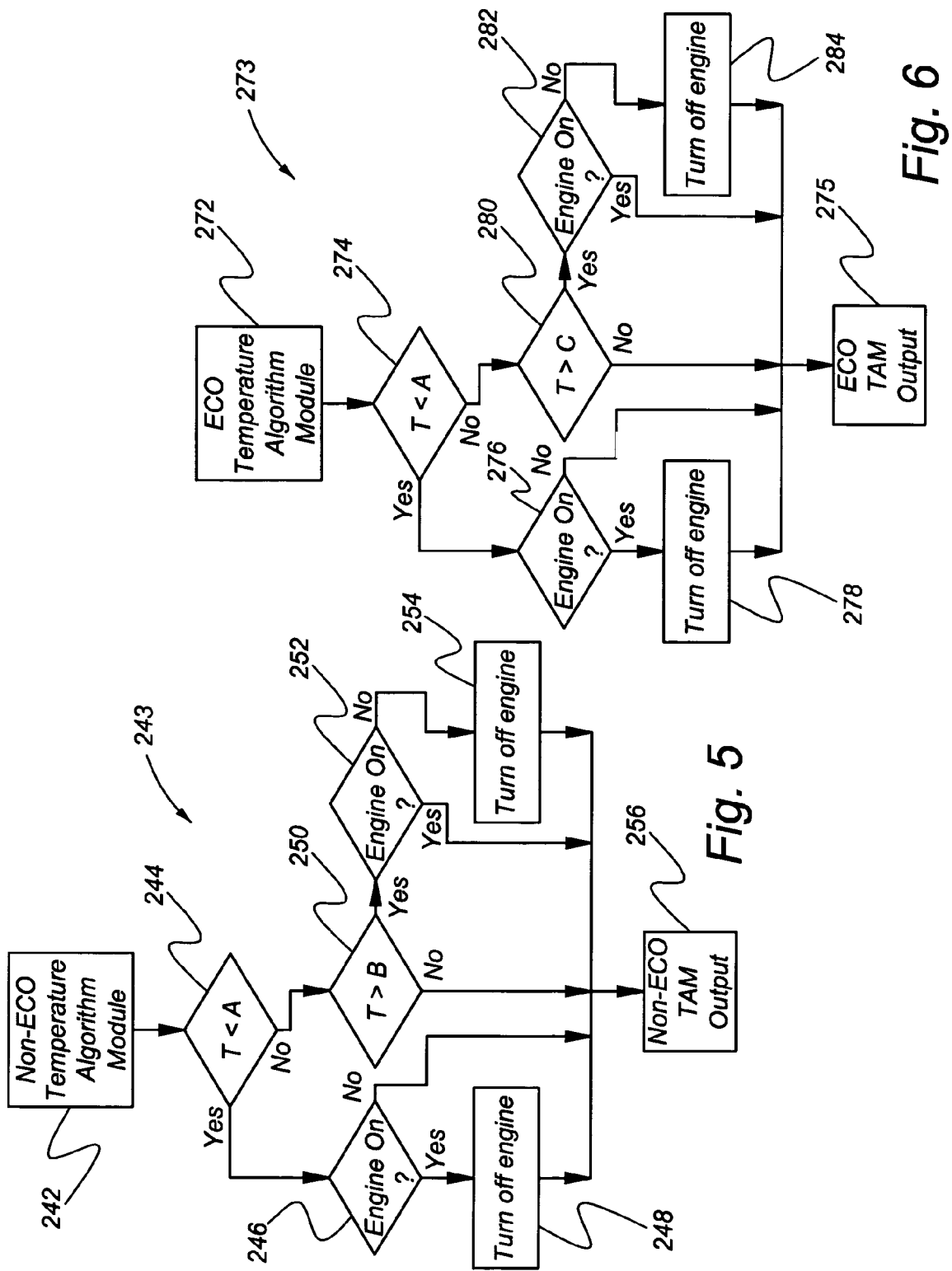

US 7,275,379 B2

AUTOMOTIVE HVAC SYSTEM AND METHOD OF OPERATING SAME UTILIZING ENTHALPY-BASED CONTROL

BACKGROUND OF THE INVENTION

The present invention relates generally to automotive HVAC systems and methods of operating such HVAC systems.

Automotive HVAC systems are well known and are utilized for heating and cooling the passenger compartments of vehicles. Hybrid vehicles, which utilize a battery and an intermittently operated internal combustion engine for vehicle propulsion, have difficulty keeping the passenger compartment cool when the engine is off. When the engine is off, the HVAC compressor, typically run by a clutch connected to the engine, is also off and the temperature in the passenger compartment can rise quickly. Since the majority of prior art automotive HVAC compressors are mechanically coupled with the internal combustion engine through an accessory system such as a clutch or the like, turning off the engine suggests a deteriorated occupant comfort due to the fact that the refrigerant compressor is non-operational while the engine is off. To maintain a certain level of air conditioning performance, the engine must be restarted, which has then a negative impact on the fuel economy of the hybrid vehicle.

A common prior art automotive HVAC control system utilizes temperature-based control wherein a temperature sensor monitors ambient temperature and sends electrical signal(s) to a HVAC control module. A control algorithm embedded into the control module compares the temperature reading with an established temperature criterion. Based upon the algorithm, a control action will be executed to either couple the compressor to or decouple it from the accessory drive by engaging or disengaging the compressor clutch.

Basing the control of the HVAC system on air temperatures alone has raised concerns in recent development of mild hybrid vehicles. One concern includes deteriorated air conditioning performance in high humidity and medium temperature ambient conditions due to the tendency to cause a musty odor to emanate from the air conditioning outlets when the engine is off. Another concern is an excessively negative impact on fuel economy in low humidity and medium to high temperature, low temperature and high humidity, and medium temperature and low to medium humidity ambient conditions because the temperature-based control method keeps the engine running or starts the engine earlier than is desirable. Fundamentally, temperature-based control is a single variable control system, in which temperature is disadvantageously the sole variable used for making operational decisions. This disadvantage is particularly undesirable when such temperature-based control is applied with a hybrid vehicle.

It is desirable, therefore, to provide a more efficient control methodology for operating an automotive HVAC system, including hybrid vehicles.

SUMMARY OF THE INVENTION

The present invention concerns a method for controlling the operation of an automotive HVAC system. The HVAC system includes at least a refrigerant compressor and a refrigerant evaporator. The method includes the steps of calculating an ambient air enthalpy value; comparing the calculated ambient air enthalpy value to at least one predetermined enthalpy value; and selectively changing the operation of the refrigerant compressor based on the comparison.

The thermodynamic properties of air at atmospheric pressure can be defined by knowing two variables: its temperature and humidity. Basically, the level of total energy (temperature, relative humidity) contained in air and the solar load determines the need for air conditioning cooling capacity. The basic variables needed to execute the control algorithm include ambient temperature and ambient relative humidity, solar load, air temperature at the evaporator outlet, and engine and/or vehicle speed. The HVAC system in accordance with the present invention advantageously includes measurement devices to provide measured values for the ambient temperature and ambient relative humidity, the solar load, the air temperature at the evaporator outlet, and the engine and/or vehicle speed in order to determine the enthalpy of the ambient air.

By introducing humidity as a second variable for controlling the operation of an automotive HVAC system, the HVAC system can be controlled based on the heat value or enthalpy contained in the air rather than on temperature alone. By doing so, the HVAC system will provide greater comfort to the vehicle passengers in high humidity, medium temperature conditions and increase the efficiency of the vehicle in medium humidity, low temperature, and low humidity, low temperature conditions. The HVAC system is also advantageously able to adjust the control of the refrigerant compressor based on measured solar load values and measured evaporator outlet temperature values.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 5 is a flowchart of a first temperature algorithm module of the flowchart shown in FIG. 3; and FIG. 6 is a flowchart of a second temperature algorithm module of the flowchart shown in FIG. 3

DESCRIPTION OF THE PREFERRED EMBODIMENT

Figure 1:
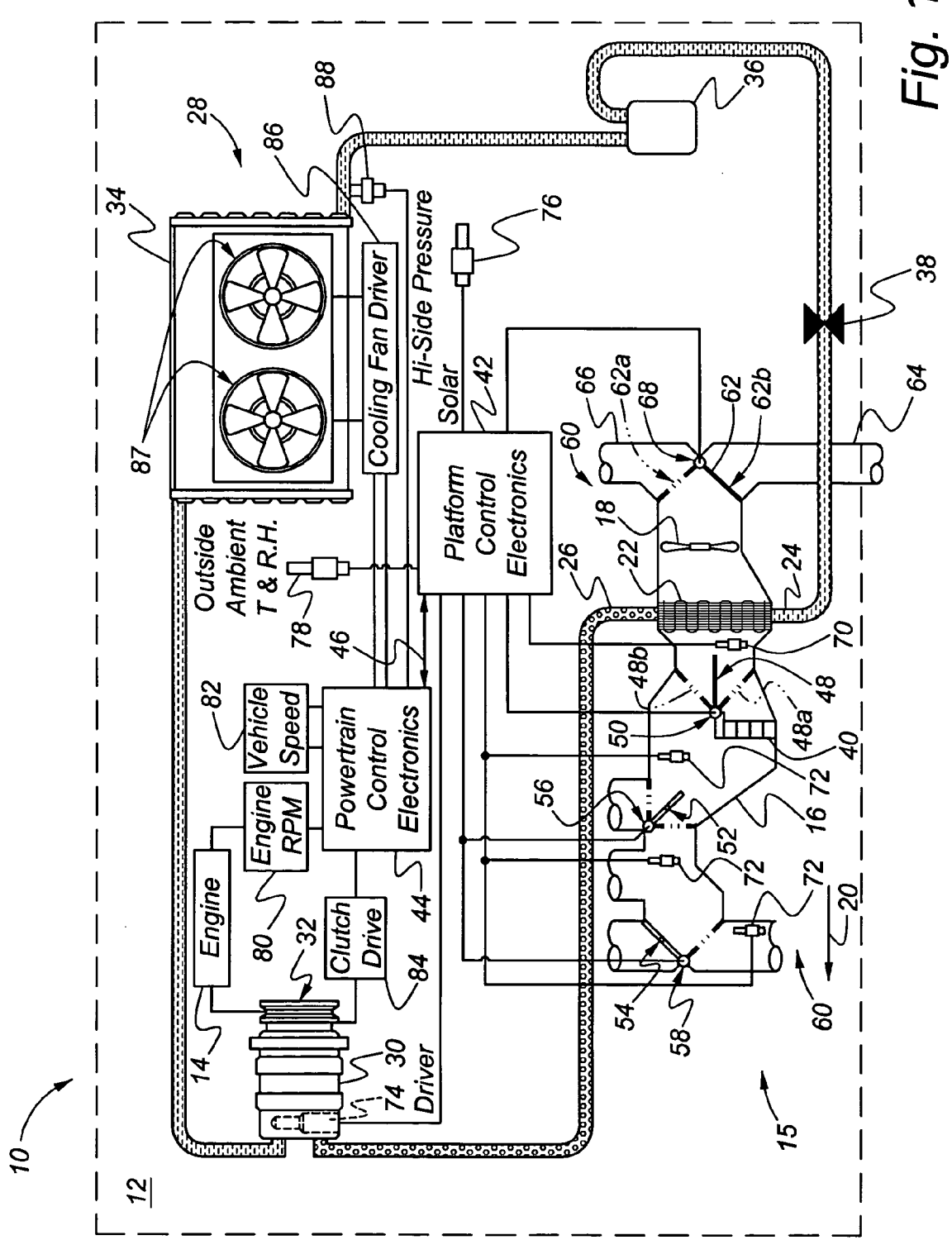
FIG. 1 is a schematic view of a HVAC system in accordance with the present invention.

Referring now to FIG. 1, a HVAC system in accordance with the present invention is indicated generally at 10. The HVAC system 10 is disposed in a vehicle, indicated schematically at 12. The vehicle 12 may be a hybrid vehicle having an internal combustion engine 14 operating in conjunction with a battery (not shown) or a conventional vehicle having the internal combustion engine 14 only. The HVAC system 10 includes a HVAC module, indicated generally at 15. The HVAC module 15 includes a HVAC air duct 16 and a blower 18 adapted to direct a flow of air in a direction indicated by an arrow 20 through the HVAC duct 16. An evaporator 22 is located within the HVAC duct 16 downstream of the blower 18. The evaporator 22 includes a refrigerant inlet 24 from and a refrigerant outlet 26 to a refrigerant circuit, indicated generally at 28.

The refrigerant circuit 28 includes a refrigerant compressor 30 that is preferably driven by the engine 14 through a clutch 32. The compressor 30 may be a fixed displacement compressor or a variable displacement compressor, as will be appreciated by those skilled in the art. Alternatively, the compressor 30 is a variable displacement compressor that is driven by the engine but does not include a clutch, or is an electric-driven compressor. The refrigeration circuit 28 also includes a condenser 34, a receiver/dryer 36, and a thermostatic expansion valve 38 in fluid communication with the compressor 30 and the evaporator 22. The thermostatic expansion valve 38 may be replaced by an orifice tube (not shown) or similar refrigerant expander. A refrigerant is contained in the refrigerant circuit 28 and so flows through the compressor 30, the condenser 34, the receiver/dryer 36, the refrigerant inlet 24, the evaporator 22, and the refrigerant outlet 26. The refrigerant is selectively circulated through the piping during operation of the HVAC system 10, discussed in more detail below. A heater core 40 is disposed in the HVAC duct 16 downstream of the evaporator 22 and includes coolant inlet (not shown) from and a coolant outlet (not shown) to an engine cooling circuit (not shown) of the internal combustion engine 14.

A HVAC electronic control module 42 is also disposed in the vehicle body 12. The HVAC control module 42 is in communication with a powertrain electronic control module 44 via a serial bus 46 or the like. The HVAC control module 42 and the powertrain control module 44 each may be a single microprocessor or a plurality of interconnected microprocessors. For example, the HVAC control module 42 and the powertrain control module 44 may be a single integrated HVAC and powertrain controller (not shown). Furthermore, the HVAC control module 42 and the powertrain control module 44 may be hardware, software, or any combination thereof as will be appreciated by those skilled in the art.

A damper 48 is disposed in the HVAC duct 16 downstream of the evaporator 22 and adjacent the heater core 40. The damper 48 includes an actuator 50, such as an electric motor or the like, that is operable to selectively expose and block the heater core 40 to an air flow from the blower 18. The actuator 50 is in communication with the HVAC control module 42. When the actuator 50 moves the damper 42 to a first position 42a, the air flowing from the blower 18 in the direction 20 bypasses the heater core 40. When the actuator 50 moves the damper 42 to a second position 42b, the air flowing from the blower 18 in the direction 20 flows through the heater core 40.

The HVAC duct 16 extends to a passenger compartment, indicated schematically at 60. A second damper 52 and a third damper 54 are disposed in the HVAC duct 16 downstream of the heater core 40. The second damper 52 includes an actuator 56, such as an electric motor or the like, and the third damper 54 includes an actuator 58, such as an electric motor or the like. The actuators 56 and 58 are each in communication with the HVAC control module 42. The dampers 52 and 54, when moved by the respective actuators 56 and 58, are operable to direct flow to various portions of the passenger compartment 60 of the vehicle body 12 such as, but not limited to, a floor outlet, a torso outlet, and a windshield outlet (not shown).

A recirculation damper 62 is disposed between an outside or fresh air inlet 64 and a return inlet 66 from the passenger compartment 60 to supply air to the blower 18. The damper 62 includes an actuator 68, such as an electric motor or the like, that is operable to selectively expose and block the heater core 40 to an air flow from the blower 18. The actuator 68 is in communication with the HVAC control module 42. The recirculation damper 62 can move between a first position 62a and a second position 62b. The recirculation damper 62 is operable to selectively provide only fresh air from the fresh air inlet 64 (when the actuator 68 has moved the damper 62 to a first position 62a), only recirculated air from the recirculation air inlet 66 (when the actuator 68 has moved the damper 62 to a second position 62b), or a mixture of fresh air and recirculated air to the blower 18.

An evaporator outlet temperature measurement device 70, such as a temperature sensor, a thermistor measurement device, or the like, is disposed in the HVAC duct 16 downstream of the evaporator 22. A plurality of duct temperature measurement devices 72, such as temperature sensors or the like, is disposed in the HVAC duct 16 downstream of the heater core 40. The measurement devices 70 and 72 are each in communication with the HVAC control module 42.

The HVAC control module 42 is connected to and in communication with a driver 74, such as software or the like, for the compressor 30, a solar load measurement device 76, and an ambient temperature and ambient humidity measurement device 78. Alternatively, the ambient temperature and ambient humidity measurement device 78 is a pair of measurement devices (not shown).

The powertrain control module 44 is connected to and in communication with the engine 14 to obtain an engine speed value, indicated schematically at 80, and a measurement device (not shown) to obtain a vehicle speed value, indicated schematically at 82. The powertrain control module 44 is also connected to and in communication with a clutch drive 84 for the compressor 30, a driver 86, such as software or the like, for at least one cooling fan 87 adjacent to the condenser 34, and a condenser outlet pressure measurement device 88.

The connections between the HVAC control module 42 and the powertrain control module 44 and the measurement devices 76, 78, 80, 82, and 88, are illustrative and a non-limiting example of control connections for the HVAC system 10. The HVAC control module 42 and the powertrain control module 44 may be connected to all or none of the measurement devices 76, 78, 80, 82, and 88, as will be appreciated by those skilled in the art.

Figure 2:
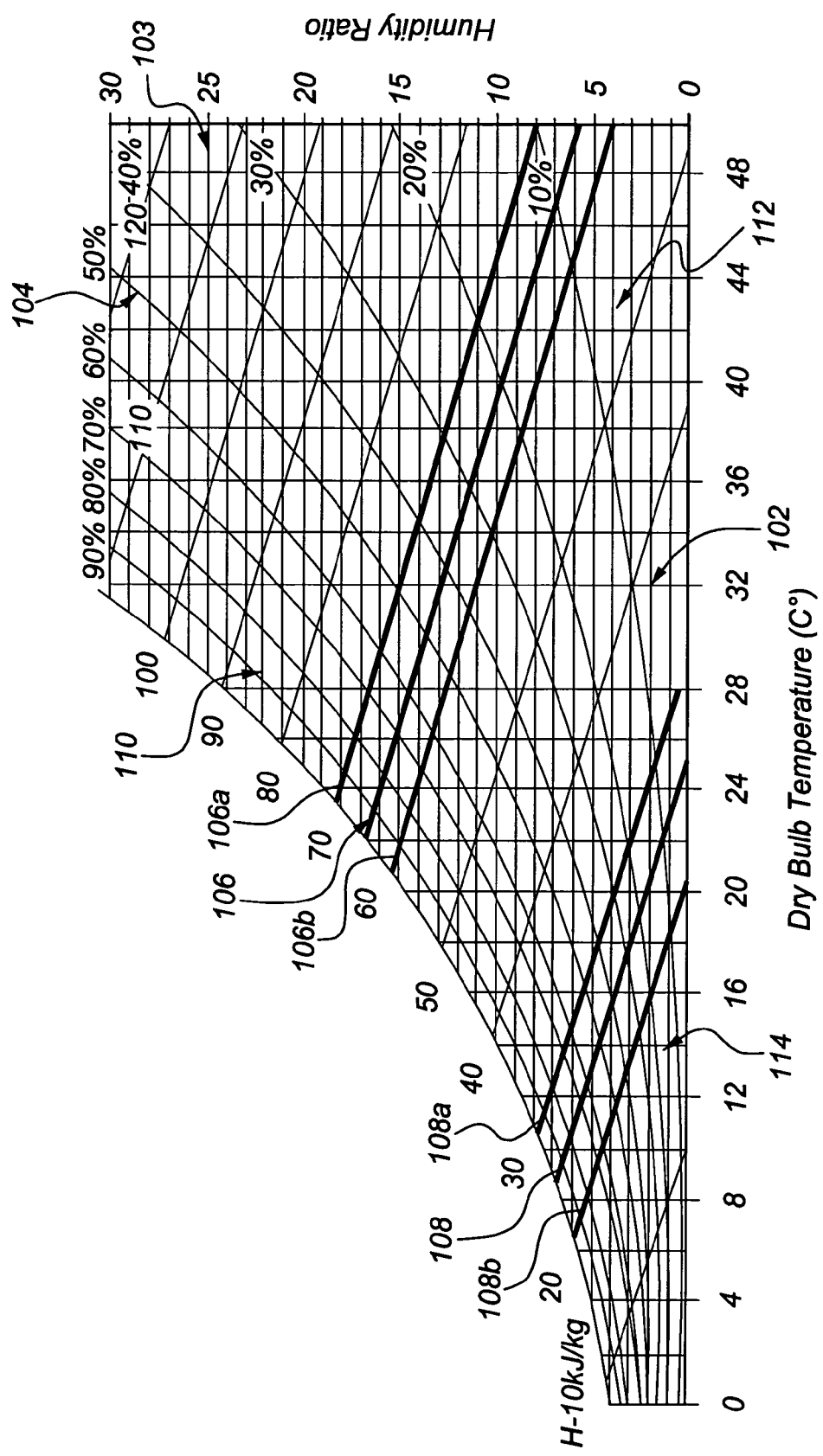
FIG. 2 is a schematic view of a psychrometric chart showing enthalpy zones in accordance with the present invention.

Referring now to FIG. 2, an example of a psychrometric chart is indicated generally at 100. Vertical lines in the chart 100 represent constant air temperature values. For example, a vertical line 102 represents a constant dry bulb temperature value equal to 32 degrees Celsius. Horizontal lines in the chart 100 represent constant air humidity ratio values. For example, a horizontal line 103 represents a constant humidity ratio value equal to 25. Elliptical lines in the chart 100 extending upwardly from left to right in the chart 100 represent constant air relative humidity values. A line 104 represents a constant relative humidity value equal to fifty percent (0.50) relative humidity. Generally straight lines in the chart 100 extending downwardly from left to right in the chart 100 represent constant air enthalpy values. A line 106 represents a constant enthalpy value equal to approximately 65 kJ/kg. The line 106 represents an upper target enthalpy zone having an upper range 106a and a lower range 106b. A line 108 represents a lower target enthalpy zone having an upper range 108a and a lower range 108b.

A first, high enthalpy, zone in the chart 100 indicated generally at 110. The high enthalpy zone 110 is the region on the chart 100 where the enthalpy values are all greater than the value of the upper target enthalpy zone 106, wherein the air has a high enthalpy value. A second, medium enthalpy, zone in the chart 100 is indicated generally at 112. The medium enthalpy zone 112 the region on the chart 100 where the enthalpy values are all greater than the value of the lower target enthalpy zone 108 and less than the value of the upper target enthalpy zone 106, wherein the air has a medium enthalpy value. A third, low enthalpy, zone in the chart 100 is indicated generally at 114. The low enthalpy zone 114 the region on the chart 100 where the enthalpy values are all less than the value of the lower target enthalpy zone 108, wherein the air has a low enthalpy value.

The corresponding values of temperature, humidity ratio, relative humidity, and enthalpy in the chart 100 can be stored as a matrix or a lookup table in, for example, a ROM chip, as stored memory in the control modules 42 or 44 or the like for easy access by the control modules 42 or 44 during operation of the HVAC system 10, discussed in more detail below. The values represented by the lines 106 and 108, and the zones 110, 112, and 114 are illustrative only and a non-limiting example of control values for the HVAC system 10.

During operation of the HVAC system 10, the ambient temperature and ambient humidity measurement device 78 provides an ambient temperature value $T_a$ and an ambient humidity value, $\phi$, to the HVAC control module 42. From the measured $T_a$ and the $\phi$ values, a saturation humidity ratio $W_s$ is calculated by the following equation:

$$W_s = (1.8 \cdot 10^{-3} + 3.79329 \cdot 10^{-4} \cdot T_a) - (4.39116 \cdot 10^{-6} \cdot T_a^2) + (5.93915 \cdot 10^{-7} \cdot T_a^3) \quad \text{(Equation 1)},$$

where $0° \text{ C.} \leq T_a \leq 50° \text{ C.}$

After $W_s$ is calculated in Equation 1, the humidity ratio, W, in FIG. 2, can by calculated by the following equation:

$$W = W_s \cdot \phi / \{1 + (1 - \phi \cdot W_s / 0.62198)\} \quad \text{(Equation 2)}$$

After the humidity ratio, W, is calculated in Equation 2, an enthalpy value, h, in FIG. 2, can be calculated by the following equation:

$$h = 1.006 \cdot T_a + W \cdot (2501 + 1.805 \cdot T_a) \quad \text{(Equation 3)}.$$

Alternatively, the HVAC control module 42 can determine the enthalpy value h by ascertaining or looking up a given enthalpy value based on two calculated variables ($T_a$ and W) from the chart 100 stored in the lookup table or matrix.

Equations 1, 2, and 3, are calculated by the HVAC control module 42 after receiving the measured $T_a$ value and the measured $\phi$ value, from the ambient temperature and ambient humidity measurement device 78. After the values for W and h are determined, the HVAC control module 42 compares the calculated values to the predetermined values for humidity ratio and enthalpy from the chart 100 stored in the matrix or the lookup table to determine the current operation and current zone 110, 112, or 114 of the HVAC system 10.

Figure 3:
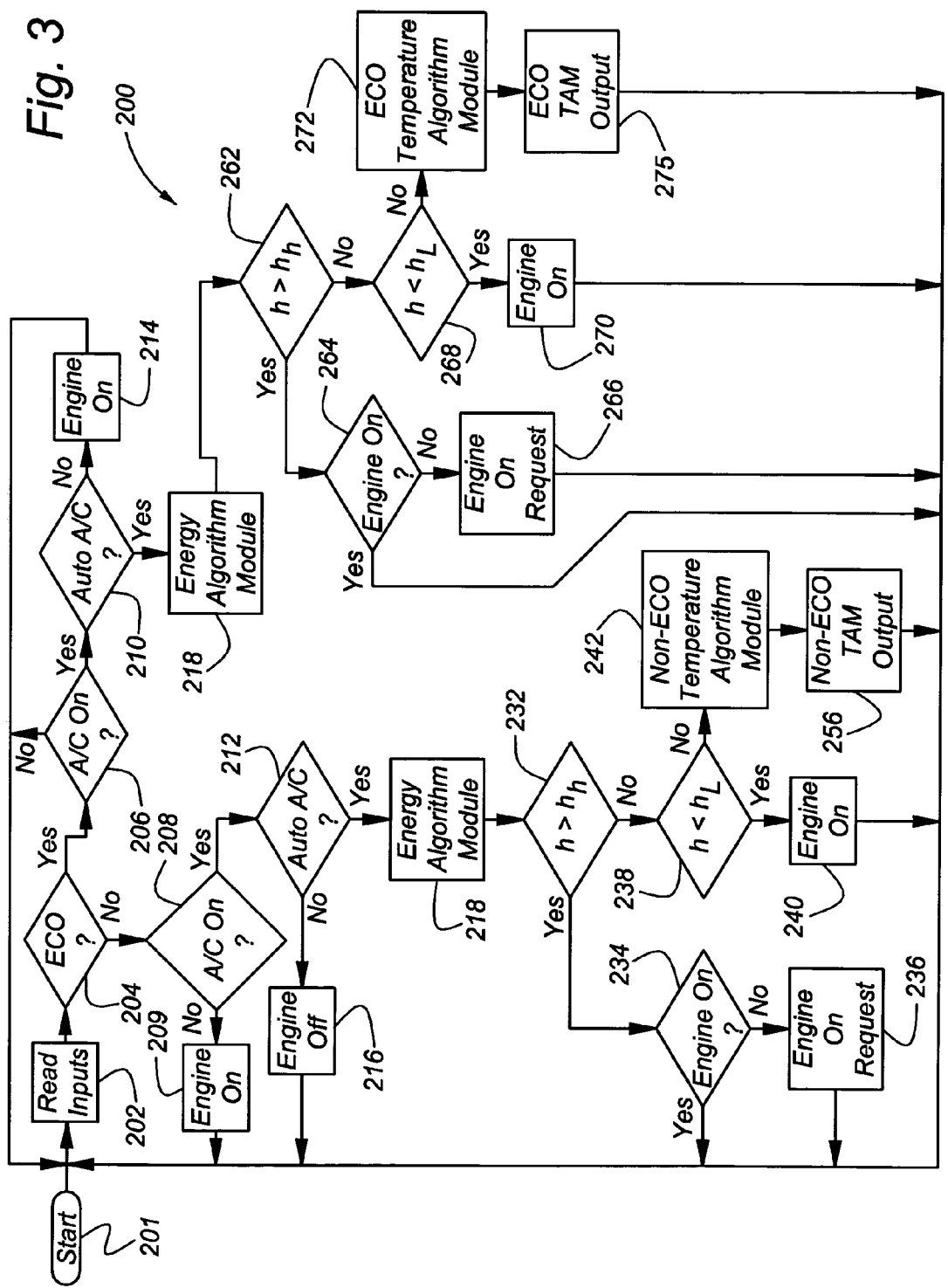
FIG. 3 is a flowchart of a method for operating the HVAC system of FIG. 1.

Referring now to FIG. 3, a flowchart of a method of operating the HVAC system 10 of FIG. 1 for a hybrid vehicle (not shown) is indicated generally at 200. The method 200 begins at a step 201 and proceeds to a step 202 where input values, such as values from the engine 14 including an engine status (not shown) or the engine speed 80, ambient temperature and ambient relative humidity from the ambient temperature and ambient humidity measurement device 78, evaporator outlet temperature from the evaporator outlet temperature measurement device 70, the vehicle speed 82, and a solar load value from the solar load measurement device 76 are input into one or both of the HVAC control module 42 and the powertrain control module 44 of FIG. 1. In a step 204, the state of the HVAC system 10 is determined, such as an economical (ECO) mode or not. If the HVAC system 10 is in an ECO mode, the method 200 moves to a step 206, where it determines if the air conditioning mode is on or off. If the air conditioning is not on, the method 200 returns to the step 202. If the HVAC system 10 in the step 204 is determined not to be in an ECO mode, the method proceeds to a step 208, where it determines if the air conditioning mode is on or off, similar to the step 206. If the air conditioning is not on, a command is sent to an engine, such as the engine 14 of FIG. 1, in a step 209 to turn the engine 14 off, such as by sending a command from the powertrain control module 44 to disengage the clutch drive 84 for the compressor 30, after which the method returns to the step 202. If the air conditioning is on, the method 200 proceeds to a step 212, where it is determined if the air conditioning is in automatic mode. If the air conditioning is not in automatic mode, the method proceeds to a step 216, where the engine 14 is turned on and after which the method returns to the step 202. Similarly, if method 200 in the step 206 determines the air conditioning is on, the method proceeds to a step 210, where it is determined if the air conditioning is in automatic mode. If the air conditioning is not in automatic mode, the method proceeds to a step 214, where the engine 14 is turned on and after which the method returns to the step 202.

Figure 4:
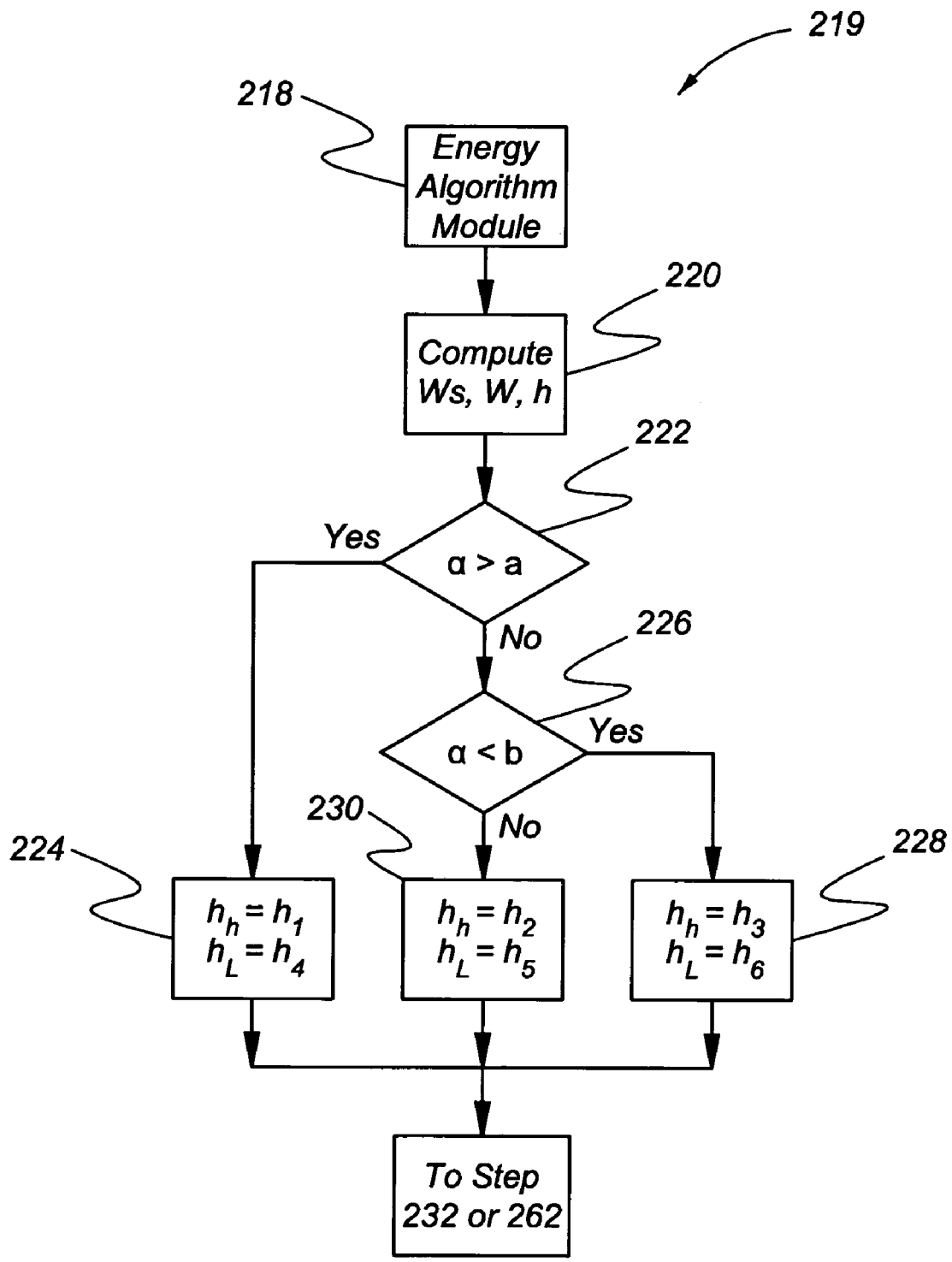
FIG. 4 is a flowchart of an energy algorithm module of the flowchart shown in FIG. 3.

After each of the steps 210 and 212, if the air conditioning is determined to be in an automatic mode, the method proceeds to a step 218 of an energy algorithm module, indicated generally at 219. Referring now to FIG. 4, after the step 218, the module 219 proceeds to a step 220, wherein the values read in the step 202 are utilized to compute a value for Ws, W, and h, utilizing equation 1, equation 2, and equation 3, respectively. After the values for Ws, W, and h are computed in the step 220, the solar load value ($\alpha$) read in the step 202 is compared to a first predetermined solar load value, a, stored in the HVAC control module 42 or the powertrain control module 44 in a step 222. If the measured solar load value ($\alpha$) is greater than a in the step 222, the module 219 proceeds to a step 224, where an upper enthalpy setpoint or control value ($h_h$) is set equal to h1 and a lower enthalpy setpoint or control value ($h_L$) is set equal to h4, discussed in more detail below. If the measured solar load value ($\alpha$) is less than a in the step 222, the measured solar load value ($\alpha$) is compared, in a step 226, to a second predetermined solar load value, b, stored in the HVAC control module 42 or the powertrain control module 44. If the measured solar load value ($\alpha$) is less than b in the step 226, the module 219 proceeds to a step 228, where the upper enthalpy control value ($h_h$) is set equal to h3 and the lower enthalpy control value ($h_L$) is set equal to h6, discussed in more detail below. If the measured solar load value ($\alpha$) is greater than b in the step 226, the module 219 proceeds to a step 230, where the upper enthalpy control value ($h_h$) is set equal to h2 and the lower enthalpy control value ($h_L$) is set equal to h5.

The h3 and h6 values correspond to a high solar load value, the h2 and h5 values correspond to a normal solar load value, and the h1 and h4 values correspond to a low solar load value. As an illustrative and nonlimiting example, the h1 value corresponds to the lower range line 106b of the upper target enthalpy zone 106 in FIG. 2. The h2 value corresponds to the upper target enthalpy zone line 106 in FIG. 2. The h3 value corresponds to the upper target enthalpy zone line 106a in FIG. 2. The h4 value corresponds to the lower range line 108b of the lower target enthalpy zone 108 in FIG. 2. The h5 value corresponds to the upper target enthalpy zone line 108 in FIG. 2. The h6 value corresponds to the upper target enthalpy zone line 108a in FIG. 2.

After setting the $h_h$ and $h_L$ values, the module 219 returns to the method 200 in either of step 232 (non-ECO mode) or a step 262 (ECO mode). If the HVAC system 10 is in the non-ECO mode, in the step 232, the calculated enthalpy value (h) calculated in the step 220 is compared to the upper enthalpy control value ($h_h$) set in the step 224, 226, or 228. If the calculated enthalpy value h is greater than the upper enthalpy control value $h_h$, this means that the ambient air is in the zone 110 of FIG. 2 wherein operation of the air conditioning system is required to maintain the passenger compartment at a desired temperature and the method proceeds to a step 234, where it determines whether the engine 14 is on or off, such as by receiving an input value from the engine speed 80. If the engine 14 is on, the method 200 returns to the step 202 and, if the engine 14 is off, a request to turn the engine 14 on is made in a step 236, such as by sending a command from the powertrain control module 44 to engage the clutch drive 84 for the compressor 30, after which the method 200 returns to the step 202. If, in the step 232, the calculated enthalpy value h is less than the upper enthalpy control value $h_h$, the method proceeds to a step 238, where the calculated enthalpy value is compared to the lower enthalpy control value ($h_L$) set in the step 224, 226, or 228. If the calculated enthalpy value h is less than the lower enthalpy control value $h_L$, this means that the ambient air is in the zone 114 of FIG. 2, wherein operation of the air conditioning is not required to maintain the passenger compartment at the desired temperature and the method proceeds to a step 240, where a request to turn the engine 14 off is made, such as by sending a command from the powertrain control module 44 to disengage the clutch drive 84 for the compressor 30, after which the method 200 returns to the step 202. If the calculated enthalpy value h is greater than the lower enthalpy control value $h_L$, this means that the ambient air is in the zone 112 of FIG. 2, and the method proceeds to a step 242 of a temperature algorithm module, indicated generally at 243 and best seen in FIG. 5, to determine whether or not operation of the air conditioning will be required to maintain the passenger compartment at the desired temperature.

Referring now to FIG. 5, in the temperature algorithm module 243, the evaporator outlet temperature, T, measured by the evaporator outlet temperature measurement device 70 in the step 202 is compared to a first predetermined temperature value, A, stored in the HVAC control module 42 or the powertrain control module 44 in a step 244. If the evaporator outlet temperature T in the step 244 is less than A, this means that air conditioning is not required and the module 243 proceeds to a step 246, where it is determined if the engine 14 is on, such as by receiving an input value from the engine speed 80. If the engine 14 in the step 246 is not on, the module 243 returns to the method 200 at the step 256. If the engine 14 in the step 246 is on, the module 243 proceeds to a step 248, where a request to turn the engine 14 off is made, such as by sending a command from the powertrain control module 44 to disengage the clutch drive 84 for the compressor 30, after which the module 243 returns to the method 200 at the step 256. If the evaporator outlet temperature T in the step 244 is greater than A, the module 243 proceeds to a step 250, where the evaporator outlet temperature T is compared to a second predetermined temperature value, B. If the evaporator outlet temperature T in the step 250 is less than B, this means that air conditioning is not required and the module 243 returns to the method 200 at the step 256. If the evaporator outlet temperature T in the step 250 is greater than B, this means that air conditioning is required and the module 243 proceeds to a step 252 to determine if the engine 14 is on, such as by receiving an input value from the engine speed 80. If the engine 14 is on, the module 243 returns to the method 200 at the step 256 and, if the engine 14 is not on in the step 252, the module 243 proceeds to a step 254, where a request to turn the engine 14 on is made, after which the module 243 returns to the method 200 at the step 256. After the step 256, the method 200 returns to the step 202.

Referring again to FIG. 3, if the HVAC system 10 is in the ECO mode, in the step 262 the calculated enthalpy value (h) calculated in the step 220 is compared to the upper enthalpy control value ($h_h$) set in the step 224, 226, or 228. If the calculated enthalpy value h is greater than the upper enthalpy control value $h_h$, this means that the ambient air is in the zone 110 of FIG. 2 wherein operation of the air conditioning system is required to maintain the passenger compartment at the desired temperature and the method proceeds to a step 264, where it determines whether the engine 14 is on or off, such as by receiving an input value from the engine speed 80. If the engine 14 is on, the method 200 returns to the step 202 and, if the engine 14 is off, a request to turn the engine 14 on is made in a step 266, such as by sending a command from the powertrain control module 44 to engage the clutch drive 84 for the compressor 30, after which the method 200 returns to the step 202. If, in the step 262, the calculated enthalpy value h is less than the upper enthalpy control value $h_h$, the method proceeds to a step 268, where the calculated enthalpy value is compared to the lower enthalpy control value ($h_L$) set in the step 224, 226, or 228. If the calculated enthalpy value h is less than the lower enthalpy control value $h_L$, this means that the ambient air is in the zone 114 of FIG. 2, wherein operation of the air conditioning is not required to maintain the passenger compartment at the desired temperature and the method proceeds to a step 270, where a request to turn the engine 14 off is made, such as by sending a command from the powertrain control module 44 to disengage the clutch drive 84 for the compressor 30, after which the method 200 returns to the step 202. If the calculated enthalpy value h is greater than the lower enthalpy control value $h_L$, this means that the ambient air is in the zone 112 of FIG. 2, and the method proceeds to a step 272 of a temperature algorithm module, indicated generally at 273 and best seen in FIG. 6 determine whether or not operation of the air conditioning will be required to maintain the passenger compartment at the desired temperature.

Referring now to FIG. 6, in the temperature algorithm module 273, the evaporator outlet temperature, T, measured by the evaporator outlet temperature measurement device 70 in the step 202 is compared to a first predetermined temperature value, A, stored in the HVAC control module 42 or the powertrain control module 44 in a step 244. If the evaporator outlet temperature T in the step 274 is less than A, this means that air conditioning is not required and the module 273 proceeds to a step 276, where it is determined if the engine 14 is on, such as by receiving an input value from the engine speed 80. If the engine 14 in the step 276 is not on, the module 273 returns to the method 200 at the step 275. If the engine 14 in the step 276 is on, the module 273 proceeds to a step 278, where a request to turn the engine 14 off is made, after which, the module returns to the method 200 at the step 275. If the evaporator outlet temperature T in the step 274 is greater than A, the module 243 proceeds to a step 280, where the evaporator outlet temperature T is compared to a third predetermined temperature value, C. If the evaporator outlet temperature T in the step 280 is less than C, this means that air conditioning is not required and the module 273 returns to the method 200 at the step 275. If the evaporator outlet temperature T in the step 280 is greater than C, this means that air conditioning is required and the module 273 proceeds to a step 282 to determine if the engine 14 is on, such as by receiving an input value from the engine speed 80. If the engine 14 is on, the module 273 returns to the method 200 at the step 275 and, if the engine 14 is not on in the step 282, the module 273 proceeds to a step 284, where a request to turn the engine 14 on is made, such as by sending a command from the powertrain control module 44 to engage the clutch drive 84 for the compressor 30, after which the module 243 returns to the method 200 at the step 275. After the step 275, the method 200 returns to the step 202.

The predetermined solar load values, a and b in FIG. 4, and the predetermined temperature values, A, B, and C in FIGS. 5 and 6 are preferably editable or changeable values in the control modules 42 or 44, depending on the configuration of HVAC system 10. For example, the predetermined temperature values A, B, and C in FIGS. 5 and 6 may be set by the occupants of the vehicle at a HVAC system user interface (not shown), such as a climate control cluster in the instrument panel or the like, during use of the vehicle 12. Moreover, while the method 200 has been described in the context of a hybrid vehicle wherein the engine 14 is turned on or off in the various steps 209, 214, 216, 236, 248, 254, 266, 278, and 284, these steps could be performed wherein the operation of a refrigerant compressor, such as the compressor 30 in FIG. 1, is selectively changed in these steps, such as by engaging or disengaging the clutch 32 of the compressor or varying the output of a variable displacement compressor, depending on the measured ambient temperature and humidity values and resulting calculated ambient enthalpy values.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for controlling the operation of an automotive HVAC system, the HVAC system including at least a refrigerant compressor and a refrigerant evaporator, comprising the steps of:
   a) calculating an ambient air enthalpy value;
   b) measuring a solar load value;
   c) adjusting at least two predetermined enthalpy values based on said measured solar load value;
   d) comparing said calculated ambient air enthalpy value to said at least two predetermined enthalpy values after said solar load adjustment; and
   e) selectively changing the operation of the refrigerant compressor based on said comparison.

2. The method according to claim 1 including measuring an ambient air temperature value and an ambient air humidity value, and wherein said ambient air enthalpy value is calculated based on said measured air temperature value and said measured air humidity value.

3. The method according to claim 1 including measuring an evaporator air outlet temperature, comparing said measured evaporator air outlet temperature to a predetermined temperature, and selectively changing the operation of the refrigerant compressor based on said comparison of said measured evaporator air outlet temperature to said predetermined temperature.

4. The method according to claim 1 wherein the automotive HVAC system operates in a hybrid vehicle including an engine and a traction motor for vehicle propulsion.

5. The method according to claim 1 wherein said at least two predetermined enthalpy values create at least a first enthalpy zone, a second enthalpy zone, and a third enthalpy zone, said third enthalpy zone having an enthalpy value greater than said second enthalpy zone and an enthalpy value less than said first enthalpy zone.

6. The method according to claim 5 wherein when said calculated air enthalpy value is in said first enthalpy zone, step e) is performed by engaging said compressor.

7. The method according to claim 5 wherein when said calculated air enthalpy value is in said second enthalpy zone, step e) is performed by disengaging said compressor.

8. The method according to claim 5 including measuring an evaporator air outlet temperature and comparing said measured evaporator air outlet temperature to a predetermined temperature, and wherein when said calculated air enthalpy value is in said third enthalpy zone, step e) is performed by engaging said compressor when said evaporator air outlet temperature is greater than said predetermined temperature and wherein step e) is performed by disengaging said compressor when said evaporator air outlet temperature is less than said predetermined temperature.

9. A method for controlling the operation of an automotive HVAC system, the HVAC system including at least a refrigerant compressor and a refrigerant evaporator, comprising the steps of:
   a) measuring an ambient air temperature value and an ambient air humidity value;
   b) calculating an ambient air enthalpy value based on said measured ambient air temperature value and said measured ambient air humidity value;
   c) measuring a solar load value;
   d) setting at least two predetermined enthalpy values based on said measured ambient air temperature value and said measured ambient air humidity value and adjusted by said measured solar load value;
   e) comparing said calculated ambient air enthalpy value to said at least two predetermined enthalpy values after said solar load adjustment; and
   f) selectively changing the operation of the refrigerant compressor based on said comparison.

10. The method according to claim 9 including measuring an evaporator air outlet temperature, comparing said measured evaporator air outlet temperature to a predetermined temperature value, and selectively changing the operation of the refrigerant compressor based on said comparison of said measured evaporator air outlet temperature to said predetermined temperature value.

11. The method according to claim 10 including a step of obtaining an operating mode of said HVAC system, said operating mode determining said predetermined temperature value.

12. The method according to claim 9 wherein said at least two predetermined enthalpy values create at least a first enthalpy zone, a second enthalpy zone, and a third enthalpy zone, said third enthalpy zone having an enthalpy value greater than said second enthalpy zone and an enthalpy value less than said first enthalpy zone.

13. The method according to claim 12 including measuring an evaporator air outlet temperature and comparing said measured evaporator air outlet temperature to a predetermined temperature, and wherein when said calculated ambient air enthalpy value is in said third enthalpy zone, step f) is performed by engaging said compressor when said evaporator air outlet temperature is greater than said predetermined temperature and wherein step f) is performed by disengaging said compressor when said evaporator air outlet temperature is less than said predetermined temperature.

14. An automotive HVAC control system, the HVAC system including at least a refrigerant compressor and a refrigerant evaporator, comprising:
   an HVAC control module in communication with a driver of said refrigerant compressor;
   a measurement device operable to provide a measured ambient temperature value and a measured humidity value to said HVAC control module;
   a solar load measurement device operable to provide a measured solar load value to said HVAC control module; and said HVAC control module operable to calculate an enthalpy value based on said measured ambient temperature value and said measured humidity value, said HVAC control module operable to adjust at least two predetermined enthalpy values based on said measured solar load value, compare said calculated enthalpy value to said at least two predetermined enthalpy values after said solar load adjustment, and selectively change the operation of the refrigerant compressor based on said comparison.

15. The HVAC control system according to claim 14 including an evaporator air outlet temperature sensor operable to provide an evaporator air outlet temperature value to said HVAC control module, said HVAC control module operable to compare said measured evaporator air outlet temperature value to a predetermined temperature setpoint and selectively change the operation of said compressor after comparing said evaporator air outlet temperature value to said predetermined temperature setpoint.

16. The HVAC control system according to claim 14 wherein said HVAC control module is operable to create at least a first enthalpy zone, a second enthalpy zone, and a third enthalpy zone, said third enthalpy zone having an enthalpy value greater than said second enthalpy zone and an enthalpy value less than said first enthalpy zone, based on said at least two predetermined enthalpy values.

17. The HVAC control system according to claim 16 wherein when said calculated air enthalpy value is in said first enthalpy zone, said HVAC control module is operable to engage said compressor.

18. The HVAC control system according to claim 16 wherein when said calculated air enthalpy value is in said second enthalpy zone, said HVAC control module is operable to disengage said compressor.

* * * * *